United States Patent

Paulus et al.

[11] Patent Number: 6,020,042
[45] Date of Patent: Feb. 1, 2000

[54] SUBSTRATE DESIGN FOR BONDED STORAGE DISKS AND METHOD OF MAKING SAME

[75] Inventors: Joseph W. Paulus, Portland; Arthur R. LeBlanc, III, Kennebunk, both of Me.

[73] Assignee: First Light Technology, Inc., Saco, Me.

[21] Appl. No.: 09/172,154

[22] Filed: Oct. 14, 1998

[51] Int. Cl.[7] ........................................... B32B 3/00
[52] U.S. Cl. ..................... 428/64.1; 425/810; 428/66.5; 428/66.6; 428/66.7
[58] Field of Search .................. 428/64.1, 66.5, 428/66.6, 66.7; 425/810

[56] References Cited

U.S. PATENT DOCUMENTS 5,476,700  12/1995  Asai ........................................ 428/156
5,718,960  2/1998  Asai ........................................ 428/64.1

*Primary Examiner*—Nasser Ahmad
*Attorney, Agent, or Firm*—Hale and Dorr LLP

[57] ABSTRACT

An improved substrate and stamper holder and method of forming substrates are disclosed. According to a preferred embodiment of the invention, a substrate for a DVD has a moat with a capillary barrier shape. Under one embodiment, the moat has a region with an abrupt outer diameter transition. One embodiment has the outer diameter transition at approximately at a right angle relative to a registering surface of the substrate. Another embodiment of the invention provides a wider moats. The improvements reduce the likelihood of resin wicking past the moats.

6 Claims, 6 Drawing Sheets

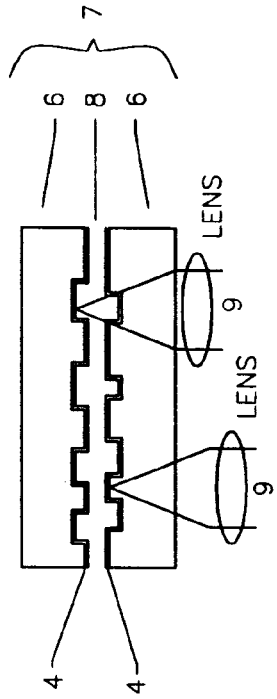
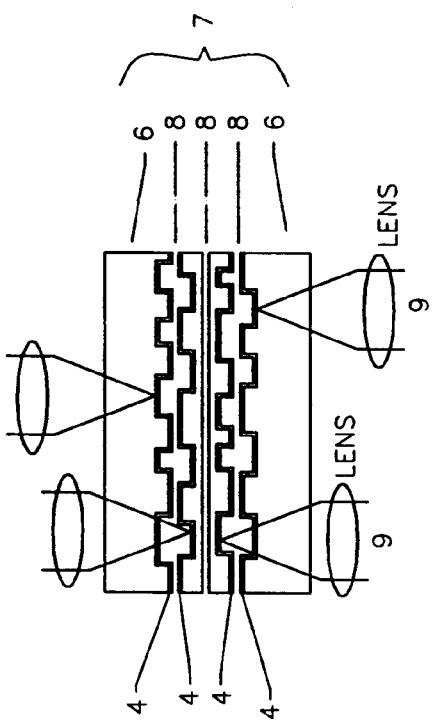
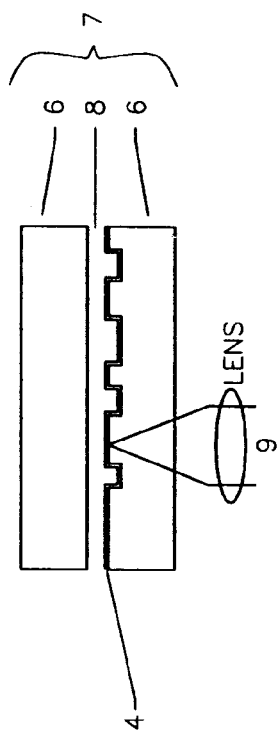
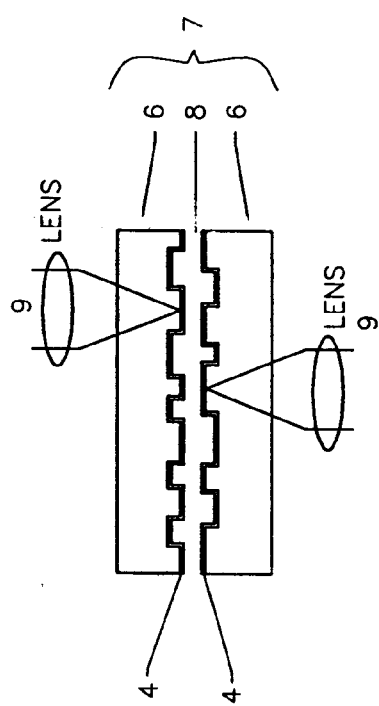
FIGURE 1C
DVD 5
FIGURE 1D
DVD 10
FIGURE 1E
DVD 9
FIGURE 1F
DVD 18

SUBSTRATE DESIGN FOR BONDED STORAGE DISKS AND METHOD OF MAKING SAME

BACKGROUND OF THE INVENTION

1. Field of the Invention

This invention relates to bonded storage disks and, more particularly, to improved methods of and systems for forming bonded storage disk, such as digital versatile disks ("DVDs").

2. Discussion of Related Art

Two popular forms of storage media are compact disks ("CDs") and digital versatile disks ("DVDs") DVD is a form of a bonded storage disk. A bonded storage disk has two or more substrates held together by a cured bonding agent. At least one of the substrates is formed to have "pits," the distribution of which is representative of the information to be stored on the disk. These pits are metallized so that when they are "hit" by an optical signal they will reflect a signal indicative of the pit and thus the information.

Because of their ability to store vast amounts of information, DVDs have been well received in the market. To date, there are four specified DVD formats: DVD5, DVD9, DVD10, and DVD18. DVD5 is a single-sided, single-layered format (see FIG. 1C); DVD9 is a single-sided, dual layered form (see FIG. 1E); DVD10 is a dual-sided, single-layered format (see FIG. 1D); and DVD18 is a dual-sided, dual-layered format (see FIG. 1F). "Single-sided" means that the disk is intended to be read from one side only. "Dual-sided" means that the disk may be read from either side, with each side storing information. "Single-layered" means that for a given side there is one "layer" of information only. In this regard, a layer of information would mean a distribution of metallized pits 4, which when hit with a light source 9 will reflect an information-carrying optical signal. "Dual-layered" means that for a given side there are two layers 4 of information. The specifications are provided in the DVD Book, v. 1.0, by the DVD Forum, which is hereby incorporated by reference in its entirety. The Figures are not to scale. For example, in actuality the substrate 6 is about 0.6 mm thick; for DVD9 the bonding layer 8 is about 50 microns thick±15 microns, ±10 microns within a DVD, and ±4 microns within a revolution; and the metallization layer 4 is on the order of tens of nanometers.

The formats specify several characteristics of a disk. For example, referring to FIGS. 1A–F, which show a plan view of a DVD and a cross-section view of DVD5, DVD9, DVD10, and DVD18 formats, the formats specify the inner diameter of the center hole, the outer diameter of the DVD, the handling area, the inner mirror band, the data area, and the outer mirror band. They also specify the shape and location of a stacking ring, the pit size, the reflectivity of the metal layers and the type of the metal, and for some formats the thickness and optical characteristics of the bonding agent used to form bond layer 8. In addition, the specifications list acceptable tolerances of certain "bulk parameters," such as "radial tilt" and "tangential tilt." The specifications also specify the thickness of the bonding layer and the acceptable amounts of bubbles and contaminants.

On the other hand, some aspects are undefined. For example, commercially-available substrate molding machines produce substrates having machine-specific moat locations and shapes. These moats are a consequence of a molding machine piece known as a "stamper holder." The stamper holder is a removable tool that is part of the mold and is used to hold the "stamper" in place. In the art, for example, there are known 22 mm moat geometries and 34 mm moat geometries. The 22 mm and 34 mm designations refer to the outer diameters of the moats. The moat is an artifact of the process and is not a design aspect with an intended function. In addition, though the reflectivity of the metal layers is specified (sometimes by minimums, other times by minimums and maximums) the actual amount of metallization is not.

To date, manufacturing DVDs has been problematic, especially for dual-layer formats and especially for achieving desirable yields. In part this is the result of the extremely tight manufacturing tolerances specified by the formats and required by the market. In other part this is due to the complexities introduced with the dual-layer arrangements having the bonding layer be an optical component of a DVD.

One of the problems affecting yields is the difficult in forming bonding layers. Consequently, there is a need in the art for a system, method and substrate that facilitates the formation of satisfactory bonding layers.

SUMMARY

According to a preferred embodiment of the invention, a substrate for a DVD has a moat shape to serve as a capillary barrier. One embodiment defines a moat region with an abrupt outer diameter transition. Another has the outer diameter transition at approximately a right angle relative to a registering surface of the substrate. Another employs a wider than conventional moat. A new stamper holder design provides the above substrate details. Unlike conventional approaches, the invention uses the moat to serve a function both in the eventual substrate and combination and in the overarching process of forming DVDs.

BRIEF DESCRIPTION OF THE DRAWING

In the drawings,

FIGS. 1A–F show the geometries of DVDs according to known DVD formats;

DETAILED DESCRIPTION

Preferred embodiments of the invention facilitate the formation of well-distributed bonding layers. More specifically, the improved substrate design of a preferred embodiment facilitates resin distribution, so that the resin will extend radially inward to the outer diameter of the moat but preferably not beyond that and especially not beyond the inner diameter of the moat. This improves the line yield, the handling operations of subsequent disks, and the appearance of completed disks.

U.S. application Ser. No. 09/081,116, "System and Method for Dispensing a Resin Between Substrates of a Bonded Storage Disk," filed May 19, 1998 to Paulus et al. and assigned to the assignees of this application, describes an exemplary DVD manufacturing system and is hereby incorporated by reference in its entirety. Among its many principles of operation, the exemplary system dispenses a resin between two substrates (a "combination") and provides a time delay in which capillary forces will cause the resin to distribute radially inward and outward. The combination is then spun and cured, which hardens the resin and "clamps" the combination together.

Though the above system attains high quality DVDs at attractive yields, it has been observed that improvements to the process (or to analogous alternative processes using capillary forces to distribute resin) may be attained with an improved substrate design. To better understand the improved design, a conventional design is described first.

Figure 1B:
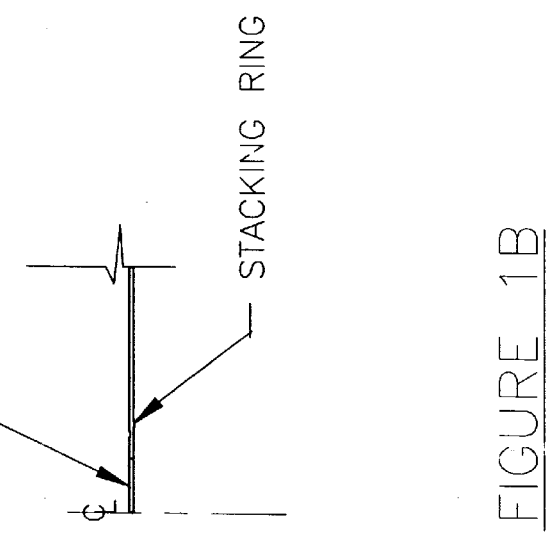
Figure 1A:
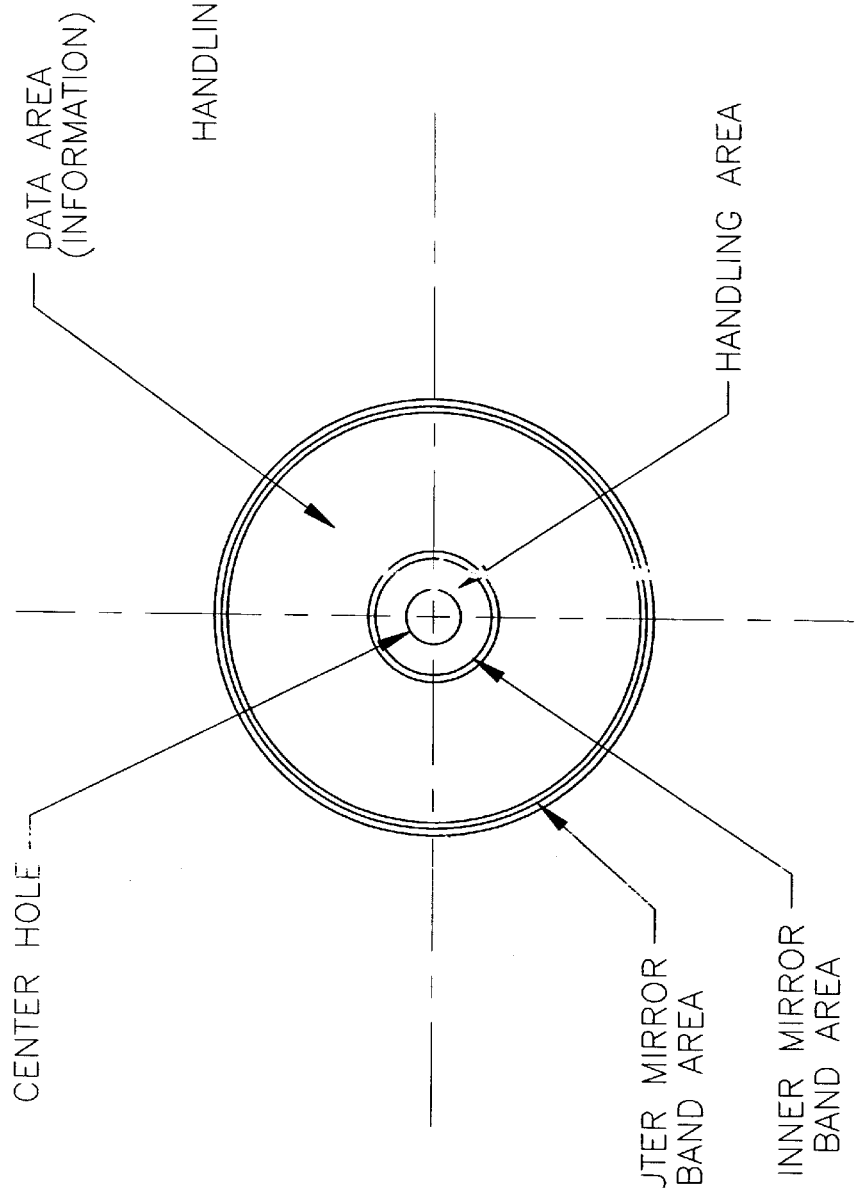
Figure 2:
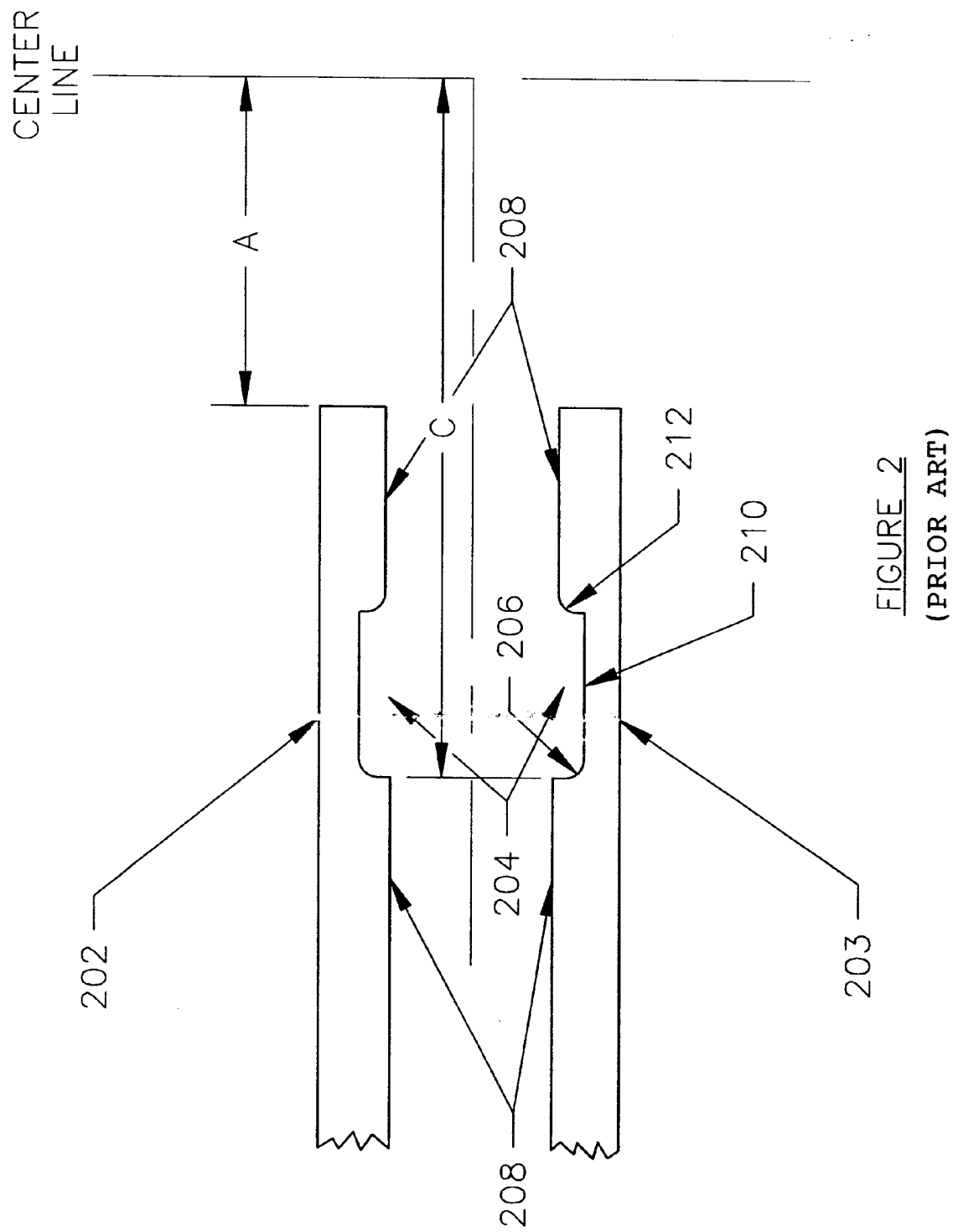
FIG. 2 is cross sectional view of a conventional substrate.

FIG. 2 shows a cross-sectional view of a conventional 22 mm design, in particular one formed by a Netstal molding machine with an ICT Axxicon mold. (The substrates are arranged to face each other as they would be when manufacturing a DVD, but spaced apart to better show significant details and aspects of the substrates, so that an upper substrate 202 and a lower substrate 203 may register.) Each substrate 202 is about 0.6 mm thick from the outer diameter of the substrate to a radius C of about 11.07 mm relative to the center line. The 11.07 mm radius is the point at which the moat 204 begins. The moat includes an outer diameter transition 206 ("O.D. transition") having a known shape that provides a gradual transition from registering surface 208 to a moat bottom 210, which is 0.144 mm deep and 1.20 mm wide. The entire moat 204 is about 1.47 mm long. The moat includes an inside diameter transition 212 ("I.D. transition) having a known shape that provides a gradual transition from moat bottom 210 to the registering surface 208. Thus, for this exemplary design, when the substrates are arranged to form a combination the two facing moats effectively form an annular void about 0.4 mm deep and 1 mm wide, with the inner radius of the void at approximately 10 mm and the outer radius at approximately 11 mm. Persons skilled in the art will appreciate that there are other known moat designs both for 22 mm diameter moats and for 34 mm moats.

Figure 3:
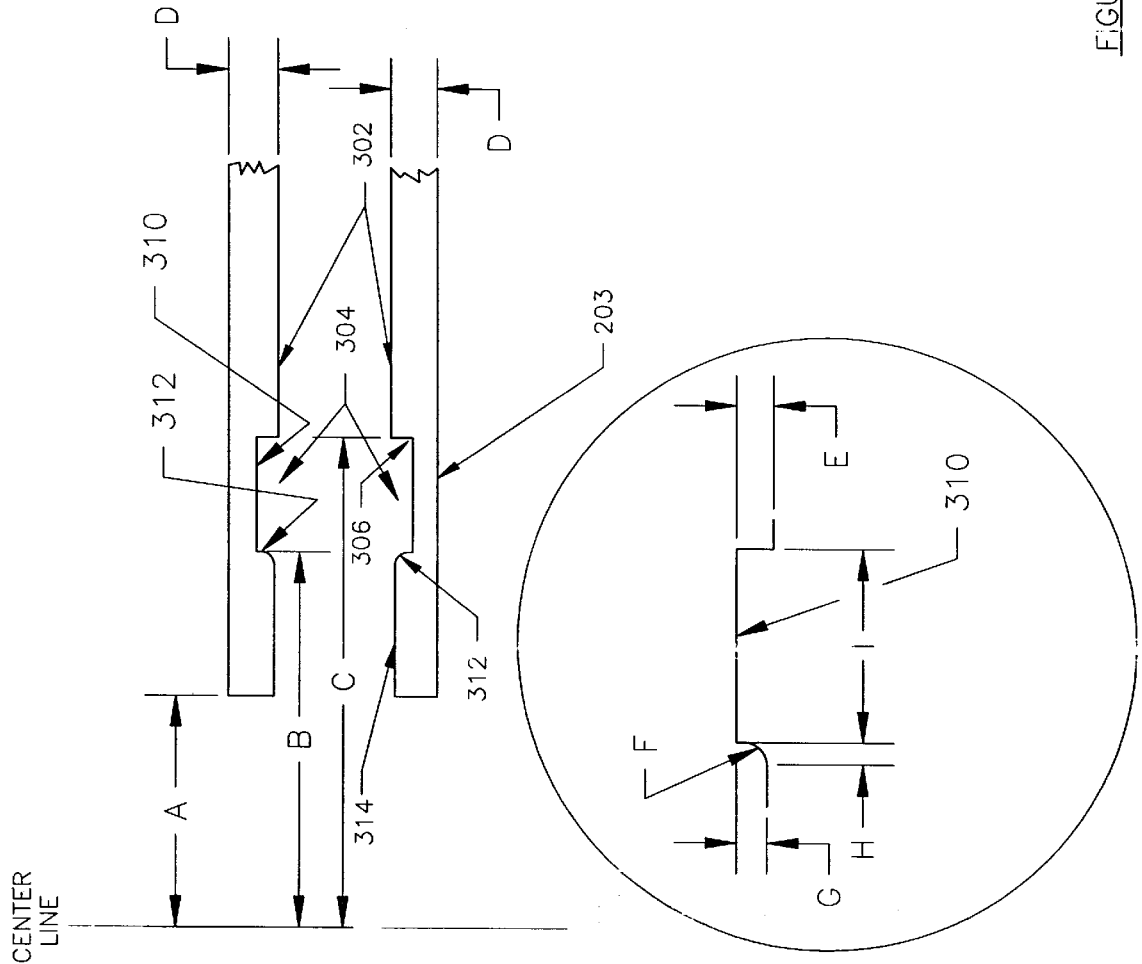
FIG. 3 is a cross-sectional view of an improved substrate according to a preferred embodiment of the invention.

FIG. 3 shows a cross-sectional view of an improved substrate. The sizes of the dimensions of the improved substrate are shown in the table below (in mm).

| A | 7.52 (radius from center-line) | D | 0.6 | G | 0.144 |
| B | 8.595 (radius from center-line) | E | 0.19 | H | 0.2 |
| C | 11.07 (radius from center-line) | F | 0.237 (radius) | I | 2.47 |

Certain aspects of the improved moat 302 have been found particularly advantageous in comparison to conventional designs. The O.D. transition 306 is abrupt, and the moat depth E at the outer diameter of the moat is slightly deeper, i.e., about 0.19 mm than the depth G at the ID transition 312. (This results in the portion of the disk radially inward of the disk being slightly thinner than the portion radially outward of the moat.) Both of these aspects reduce the rate of capillary flow once the resin has reached the outer diameter of the moat. Moreover, the improved moat bottom I is wider, reducing the chances of resin extending beyond the moat. It has been observed that with conventional substrate arrangements resin will wick past the inner diameter of the moat in approximately one minute. Wicking past the inner diameter is chosen as a measurement reference point because at this point the resin is visible in a completed DVD and because the resin is likely to contaminate machine arbors. In contrast, with the improved substrate this time is increased to about 4.5 minutes.

The shape of the I.D. transition 312 is conventional, and the outer radius C remains unchanged. By keeping these dimensions conventional the changes needed in the molding process and molding machine are minimized and limited to changes in the stamper holder.

Figure 4A:
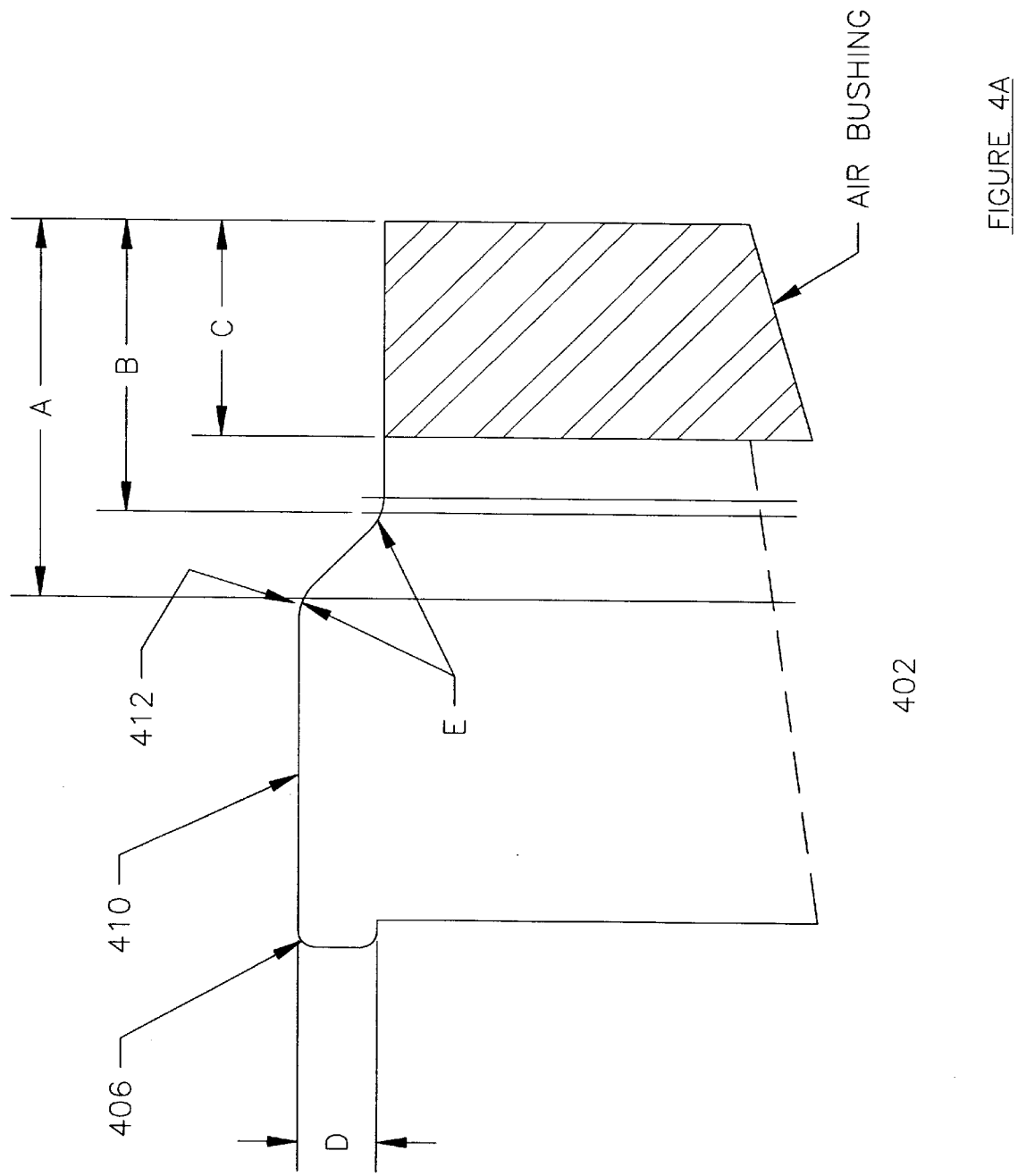
FIGS. 4A–B are cross-sectional views of an exemplary stamper holder that may be used to make improved substrates according to a preferred embodiment of the invention.
Figure 4B:
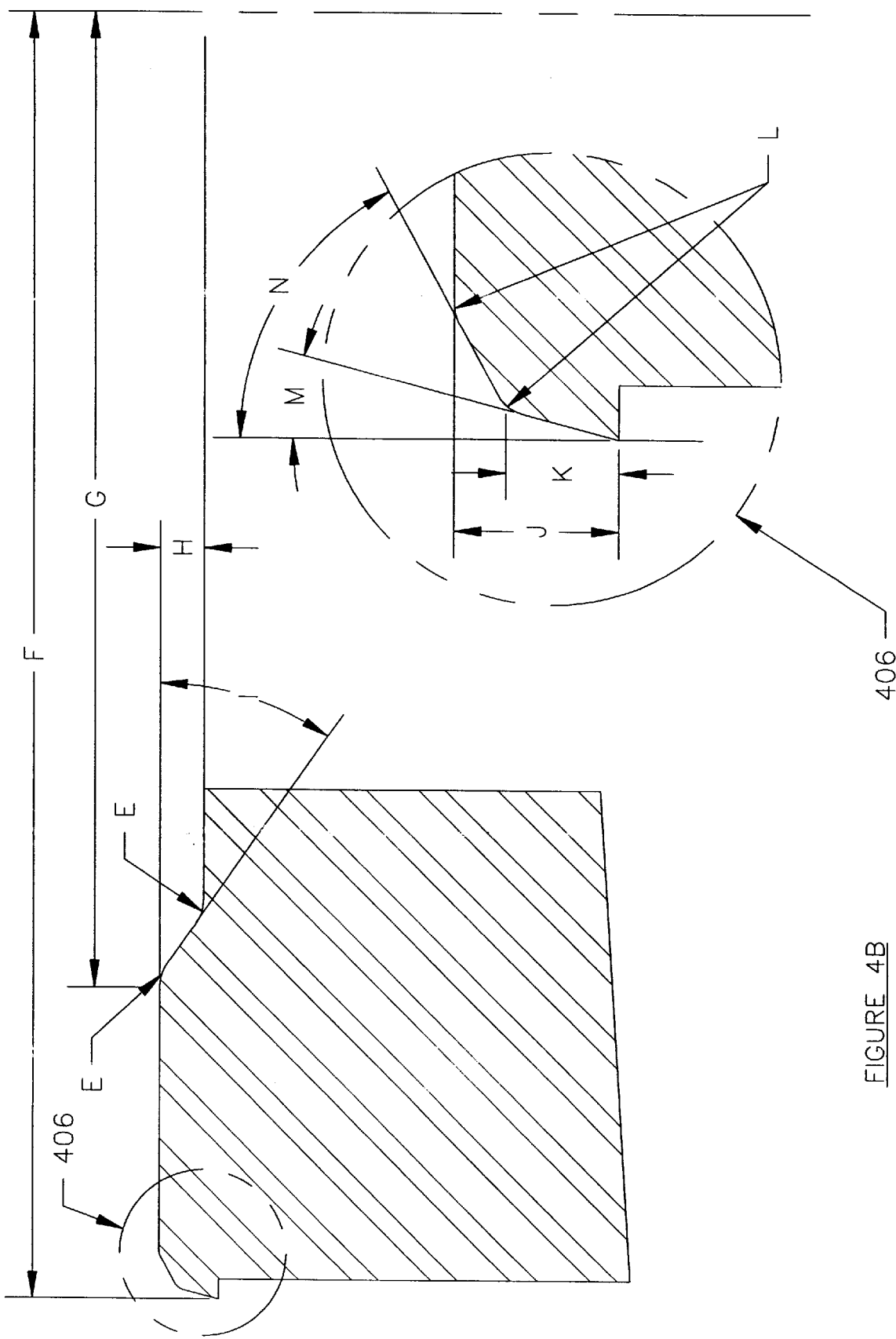

FIGS. 4A–B shows a partial cross-sectional view of a molding machine stamper holder according to a preferred embodiment of the invention. ("Stamper holders" are known in the art.) The stamper holder 402 corresponds to the improved substrate 302 described above. The moat bottom 310 and transitions 306 and 312 are defined by DVD holding surface 410. Outer edge 406 "holds" the substrate at a position corresponding to the O.D. transition 306, and feature 412 is the portion that holds a substrate at an I.D. transition. The shape of the I.D. transition is conventional, but its radial position is new. The sizes of the affected dimensions of an exemplary stamper holder (in mm) are shown in the table below.

| A | 17.94 (diameter) | F | 22.14 (diameter) | K | 0.11 |
| B | 17.4 (diameter) | G | 17.2 (diameter) | L | 0.5 (radius) |
| C | 17 (diameter) | H | 0.144 | M | 10° |
| D | 0.2 | I | 30° | N | 45° |
| E | 0.2 (radius) | J | 0.19 | | |

The improved substrate may be further modified yet remain in the scope of the invention. For example, the moat width may be changed, again without requiring significant changes in the molding or stamping process or apparatus. Under the above-described embodiment the 2.47 mm wide moat is used so that a small portion 314 of the inner diameter of the substrate is thicker than that at the moat bottom to improve the bonded disk's strength.

The improved design reduces the likelihood of resin migrating past the moats. Such migration, among other things, could contaminate certain part of the machine that come into contact with the inner portions of a substrate combination, e.g., arbors, and consequently cause contamination of subsequent DVDs in a DVD manufacturing machine. Moreover, if resin were to migrate past the moats, concentric alignment of a top and bottom substrate may be affected and result in tilt of the eventual DVD. Also, since the inner portions of a DVD may be translucent, if the resin were to migrate past the moat, the resin's appearance may be perceived negatively and considered as an indication of a poor quality DVD whether or not the DVD is within specification.

The improved substrate and holder are described with particular emphasis on a 22 mm design. Persons skilled in the art will appreciate that the inventive feature analogously apply to other geometries including 34 mm designs. Likewise, the substrate details described may be modified to attain similar affects. For example, though the preferred embodiment use an outer diameter transition that is at approximately a right angle relative to the DVD surface, advantages may be attained by modifying the outer diameter transition to have a steeper gradient than conventional designs. In this regard, a steeper gradient should be considered as an "abrupt" transition, and an abrupt transition should not be limited to the right angle embodiment. Other profiles, e.g., greater than 90 degrees, would also attain wicking advantages but could be more difficult to manufacture than the preferred embodiment. Likewise, the moat may be widened to attain further advantages with regard to wicking but potentially at the cost of reduced DVD strength. Likewise, the moat may be made narrower than the above-detailed embodiments but still made wider than conventional and attain advantages. Moreover, the above aspects could be further modified, for example, so that the improved outer diameter transition and moat depth could be moved radially outward and deeper, but again at the expense of requiring more changes to a substrate molding machine and process.

Unlike any known approaches, the detailed embodiment defines a moat shape so that it serves a function, in particular a capillary barrier function. Conventionally, the moat was an artifact of the process. The inventors realized that the moat could be modified to attain better distributed resin and also to improve the overall process of making DVDs. The improved design widens the capillary window in which a DVD can be desirably spun and cured. The increased window should result in better DVDs and in improved yields. Having described an exemplary embodiment, it should be apparent to persons of ordinary skill in the art that changes may be made to the embodiment described without departing from the spirit and scope of the invention.

What is claimed is:

1. A stamper holder having
   a stamper holding surface to hold a stamper during substrate formation,
   an outer edge region starting at an outer diameter of the holding surface and extending substantially perpendicular to the stamper holding surface for a first length, and extending for a second length at about 45 degrees displaced from the stamper holding surface, the second length ending at a substantially planar annular surface that is parallel to the holding surface and that extends to an inner diameter transition region,
   the outer edge region, the annular surface, and the inner diameter transition region in combination defining a moat forming surface, the profile of said moat surface forming a capillary barrier for liquids encountering said moat.

2. The stamper holder of claim 1 wherein the first length of the outer edge region is about 10 degrees displaced from a normal to the stamper holding surface.

3. The stamper holder of claim 1 wherein the annular planar surface is greater than about 1.47 mm wide radially from an inner to an outer diameter.

4. The stamper holder of claim 3 wherein the annular planar surface is about 2.67 mm wide radially from an inner to an outer diameter.

5. A stamper holder having
   a stamper holding surface to hold a stamper during substrate formation,
   an outer edge region starting at an outer diameter of the holding surface and extending to a substantially planar annular surface that is parallel to the holding surface and that extends to an inner diameter transition region, the annular planar surface greater than about 1.47 mm wide radially from an inner to an outer diameter of the annular surface
   the outer edge region, the annular surface, and the inner diameter transition region in combination defining a moat forming surface, the profile of said moat surface forming a capillary barrier for liquids encountering said moat.

6. The stamper holder of claim 5 wherein the annular planar surface is about 2.67 mm wide radially from an inner to an outer diameter.

* * * * *